(12) United States Patent
Hegarty et al.

(10) Patent No.: US 6,467,616 B2
(45) Date of Patent: Oct. 22, 2002

(54) APPARATUS FOR HOLDING A DISC-LIKE ARTICLE

(75) Inventors: John Hegarty, Dublin; Dominic Southgate, Naas, both of (IE)

(73) Assignee: Dualbox Limited, Dublin (IE)

( * ) Notice: Subject to any disclaimer, the term of this patent is extended or adjusted under 35 U.S.C. 154(b) by 0 days.

(21) Appl. No.: 09/995,741

(22) Filed: Nov. 29, 2001

(65) Prior Publication Data

US 2002/0038769 A1 Apr. 4, 2002

Related U.S. Application Data

(63) Continuation of application No. PCT/IE00/00069, filed on May 31, 2000.

(30) Foreign Application Priority Data

May 31, 1999 (IE) .............................................. S990446
Apr. 28, 2000 (IE) ......................................... S2000/0321

(51) Int. Cl.[7] .............................................. B65D 85/57
(52) U.S. Cl. .................... 206/308.1; 206/511; 312/9.22
(58) Field of Search ............................ 206/308.1, 310, 206/493, 309, 511, 512; 312/9.11, 9.16, 9.19, 9.22, 9.41, 9.21, 9.26, 9.47, 9.48, 9.64, 9.57

(56) References Cited

U.S. PATENT DOCUMENTS

| | | | |
|---|---|---|---|
| 4,702,369 A | * | 10/1987 | Philosphe ................ 206/308.1 |
| 4,722,439 A | | 2/1988 | Grobecker et al. |
| 4,899,875 A | * | 2/1990 | Herr et al. ............... 206/308.1 |
| 5,213,209 A | | 5/1993 | Song |
| 5,590,768 A | * | 1/1997 | Hilton et al. ............ 206/308.1 |
| 5,709,300 A | * | 1/1998 | Bolognia et al. ........ 206/308.1 |
| 5,725,105 A | | 3/1998 | Boland |
| 5,746,314 A | * | 5/1998 | Knutsen et al. .......... 206/308.1 |
| 5,788,068 A | * | 8/1998 | Fraser et al. ............. 206/308.1 |
| 5,819,930 A | * | 10/1998 | Yu .......................... 206/308.1 |
| 5,931,295 A | | 8/1999 | Kaupp |

FOREIGN PATENT DOCUMENTS

| | | |
|---|---|---|
| EP | 0671743 A2 | 9/1995 |
| EP | 0866458 A1 | 9/1998 |
| FR | 2753297 | 3/1998 |
| WO | WO87/05884 | 10/1987 |
| WO | WO 98/43247 | 10/1998 |

* cited by examiner

Primary Examiner—Luan K. Bui
(74) Attorney, Agent, or Firm—Jacobson Holman PLLC

(57) ABSTRACT

A case stores CDs in a drawer which slides out from between an upper cover and a lower cover. The drawer has a handle projecting forwardly from the covers and which can be easily gripped by a user. A CD retainer in the drawer has a lip which grips a CD by snap-fitting over a side edge of the central aperture of the CD. The grip is released by the user simply pressing a push button, causing longitudinal movement of the retainer because it is on an arm extending between the button and a resilient anchorage.

15 Claims, 9 Drawing Sheets

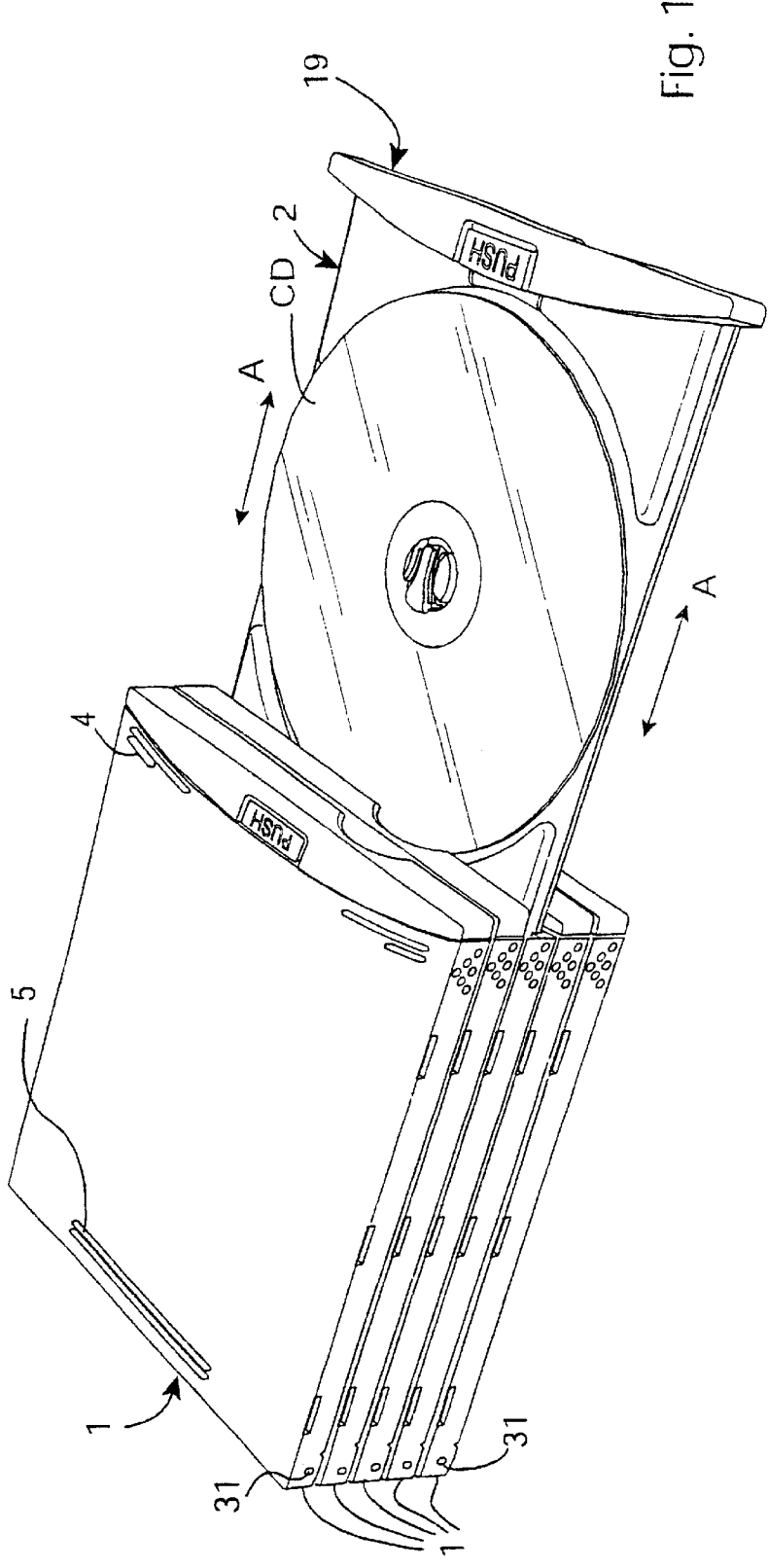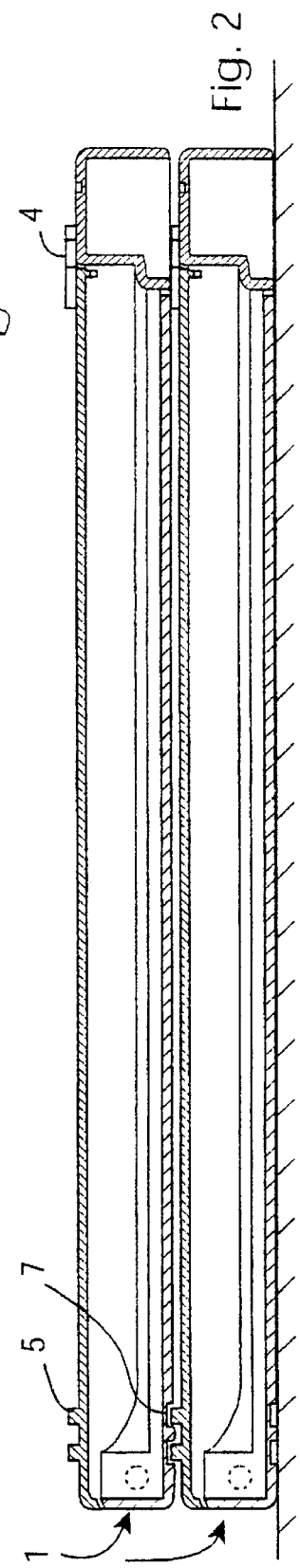

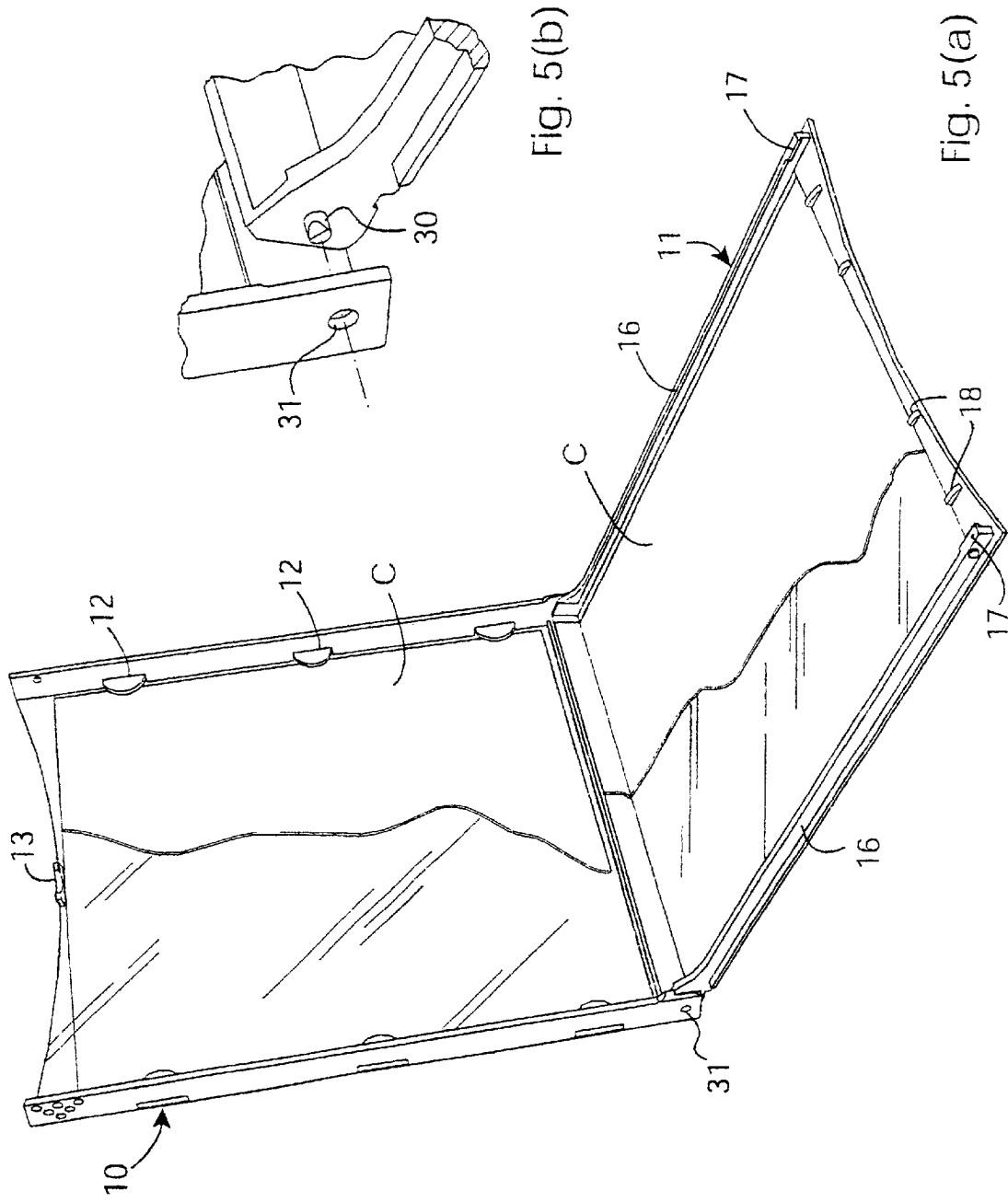

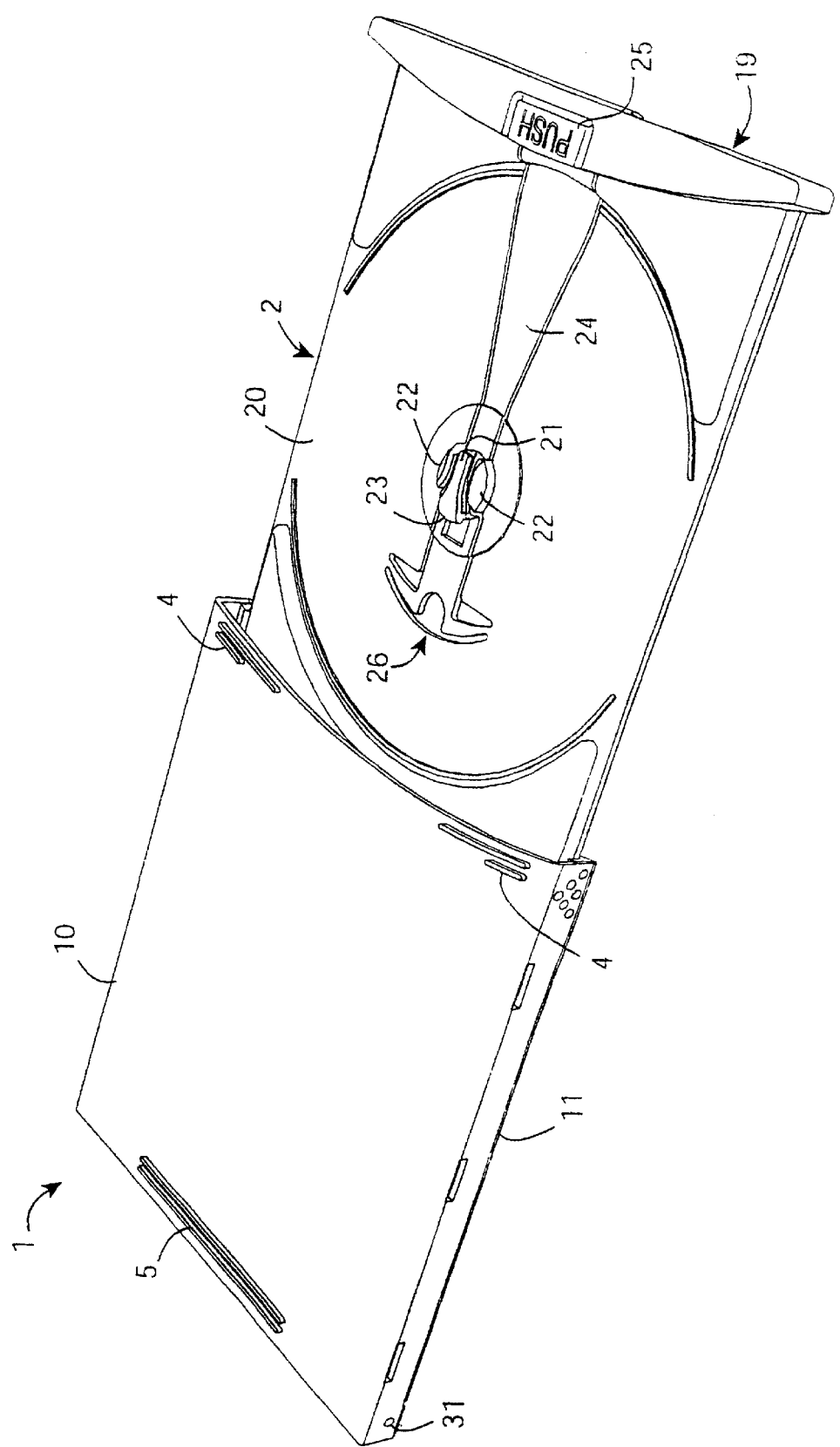

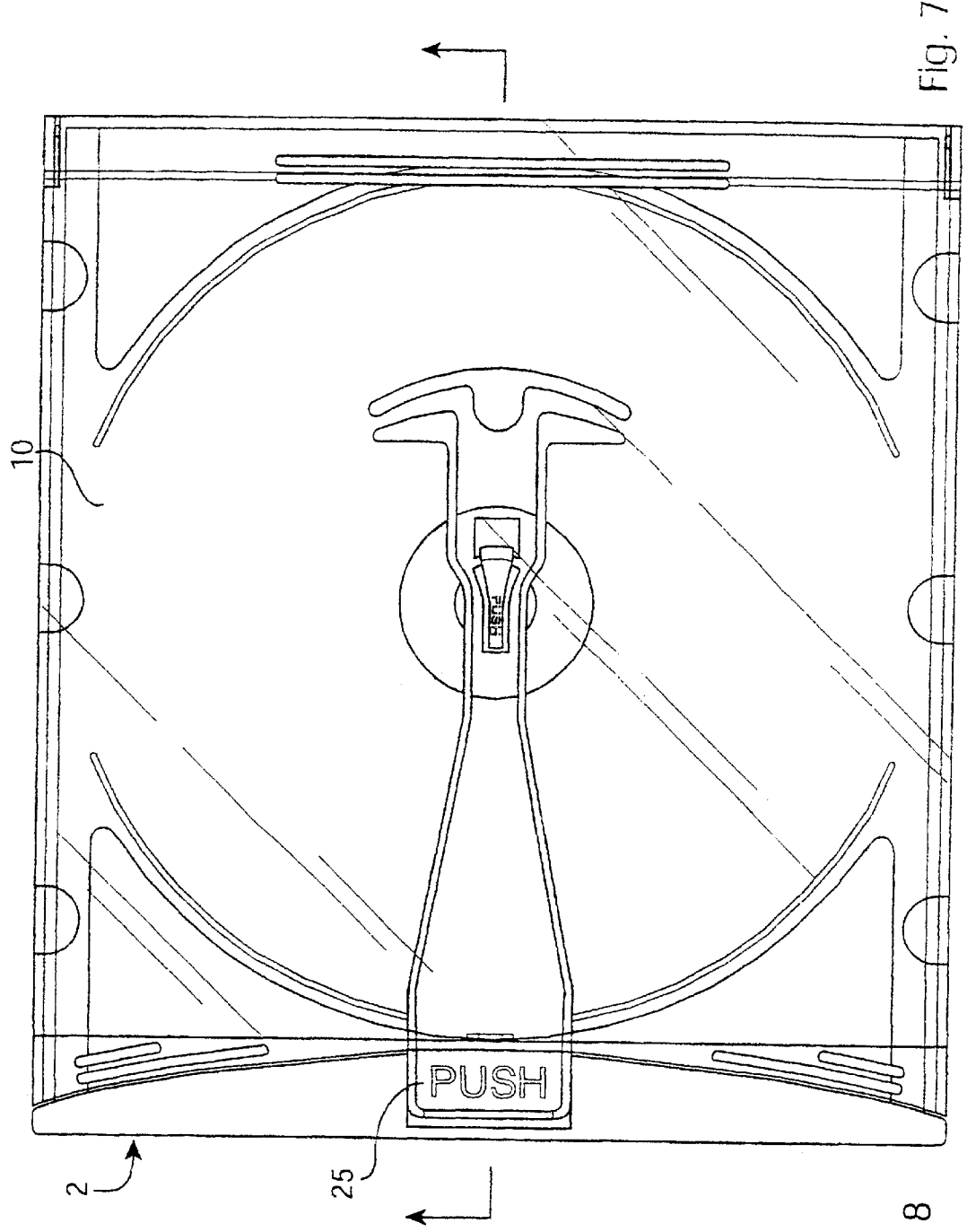
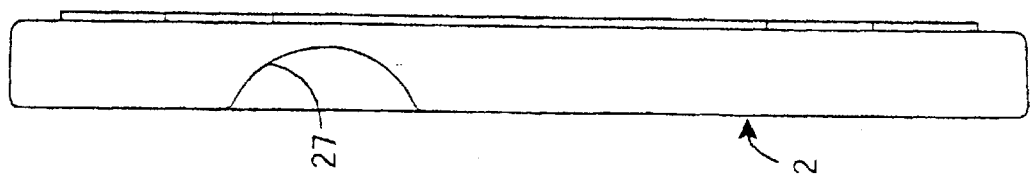

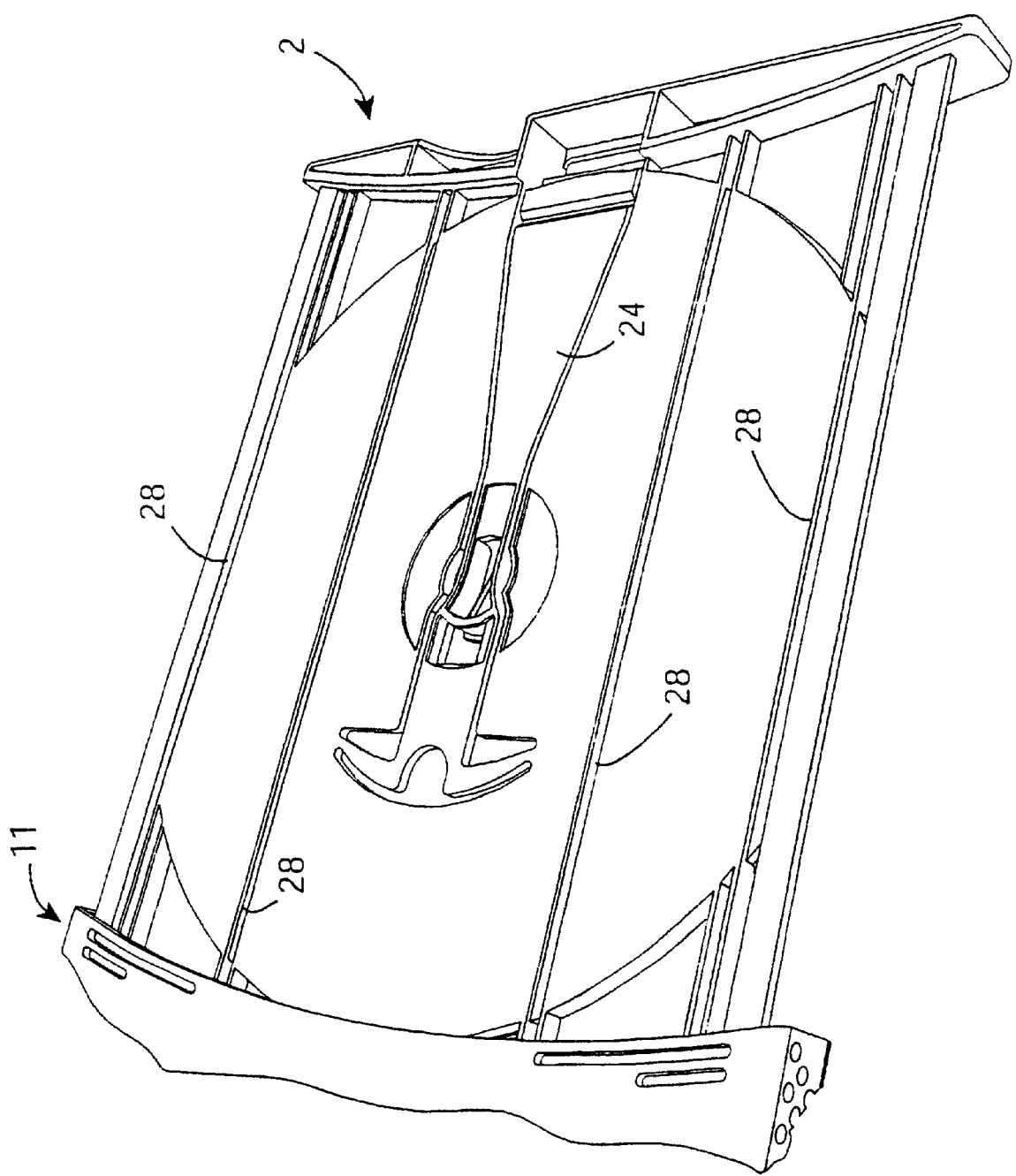

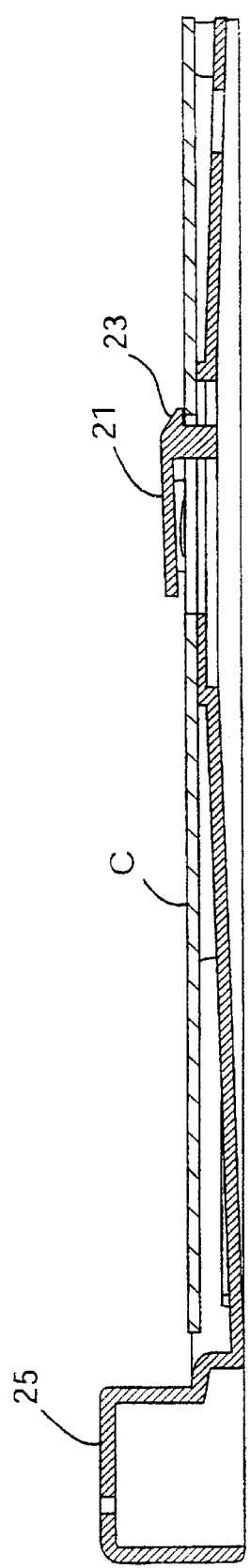
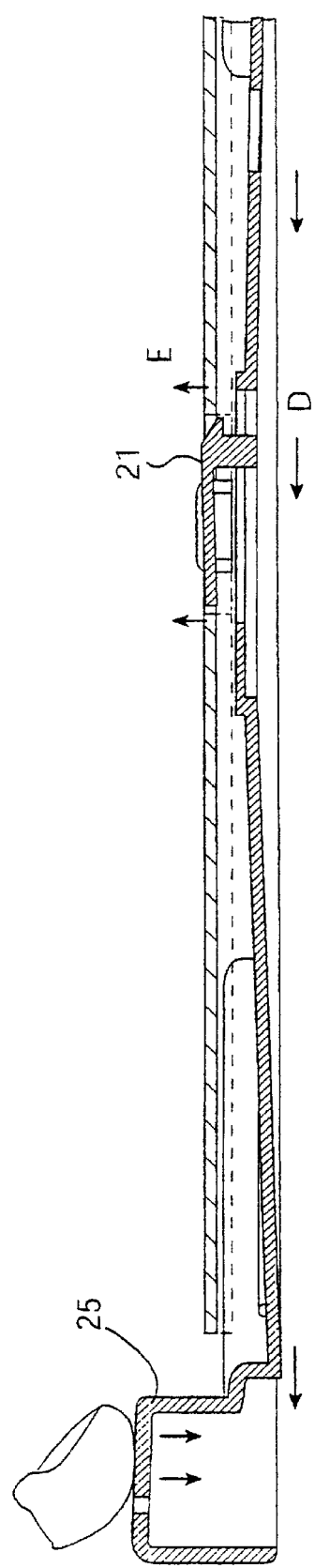

APPARATUS FOR HOLDING A DISC-LIKE ARTICLE

This is a continuation of PCT/IE00/00069 filed May 31, 2000 and published in English.

FIELD OF THE INVENTION

The invention relates to an apparatus for holding (storing) a disc-like article such as a CD or a DVD.

PRIOR ART DISCUSSION

At present the most widely used apparatus of this type is a CD case comprising hinged covers, one of which supports a CD retainer. A CD is removed by removing the case from a storage rack or shelf, opening the covers, and pressing the retainer down to release the CD. Other holders have been described in the art. For example, WO87/05884 describes a case having a drawer with a locking and spring biassing arrangement. U.S. Pat. No. 5931295 also describes a case with a drawer-like sliding unit which is biassed outwardly by a spring. U.S. Pat. No. 5213209 describes a case having a drawer which is automatically locked upon closure and automatically opened when released by a single touch. WO 98/43247 describes a case having spring and locking arrangements associated with a drawer.

Thus, while various developments have been made for CD cases to provide an alternative means for inserting and removing a CD, it appears that they are quite complex because of the spring and locking arrangements. Such complexity adversely affects both manufacturing cost and reliability.

The invention is therefore directed towards providing an apparatus for holding disc-like articles which is of simpler construction and is also easier to use than the existing apparatus.

SUMMARY OF THE INVENTION

According to the invention, there is provided an apparatus for holding a disc-like article, the apparatus comprising:

an upper cover hinged to a lower cover, a drawer comprising means for holding the article and being engaged with a cover for sliding action between an inner position and a forward position at which the article is exposed, characterised in that, the drawer comprises a handle projecting forwardly of the covers to allow a user grip the drawer.

In one embodiment, the drawer comprises a retainer for gripping an article, and the retainer is connected to a user actuator in the handle.

In one embodiment, the actuator comprises a push button.

Preferably, the retainer is connected to the actuator by an arm.

In one embodiment, the arm is connected to the drawer at the end opposite the handle by a resilient anchorage which allows movement of the arm and thereby the retainer in response to user pressing of the actuator.

In one embodiment, the anchorage comprises means for causing movement of the arm and the retainer in a direction having a longitudinal component in the plane of the drawer.

In another embodiment, the retainer comprises a lip comprising means for snap-fitting engagement with an article at a side edge.

In one embodiment, the retainer comprises a push button for user removal of an article.

Preferably, the drawer and a cover comprise inter-engaging formations for guiding sliding movement of the drawer.

In a further embodiment, the formations comprise projections on a cover located to retain an information card and which engage corresponding grooves in the drawer.

Preferably, the projections are located adjacent a front side edge of the cover.

In another embodiment, the covers comprise means for snap-fitting engagement when closed.

In one embodiment, the covers comprise formations on upper and lower surfaces of the case for engagement when stacked one on top of the other.

In another embodiment, the formations comprise ridges on an upper surface of the case, and corresponding grooves in a lower surface of the case.

Preferably, at least some of the formations are curved.

In one embodiment, the covers are hinged together by a releasable hinge.

In another embodiment, the releasable hinge comprises a chanifered pin and corresponding aperture on each side of the covers, the chamfered face of the pin being located whereby over-stressing of the hinge causes a sliding movement over said face to disengage the pin from the aperture.

In one embodiment, the covers and the drawer are of injection moulded construction.

DETAILED DESCRIPTION OF THE INVENTION

BRIEF DESCRIPTION OF THE DRAWINGS.

The invention will be more clearly understood from the following description of some embodiments thereof given by way of example only with reference to the accompanying drawing in which: FIG.

FIG. 1 is a perspective view from above of a stack of CD cases nested together;

FIG. 2 is a cross-sectional view illustrating how the cases nest together;

FIG. 5(a) is a perspective view from above showing upper and lower covers and the manner in which they hold information cards, and FIG. 5(b) is a detailed view showing how the upper and lower covers are hinged together;

FIG. 6 is a perspective view from above showing a case with the drawer opened;

FIG. 7 is a top plan view of the case;

FIG. 8 is a front view of the case;

FIG. 9 is a underneath perspective view of the drawer;

FIGS. 12 and 13 are side cross-sectional views showing tile manner in which the release mechanism operates.

DESCRIPTION OF THE EMBODIMENTS

Figure 3:
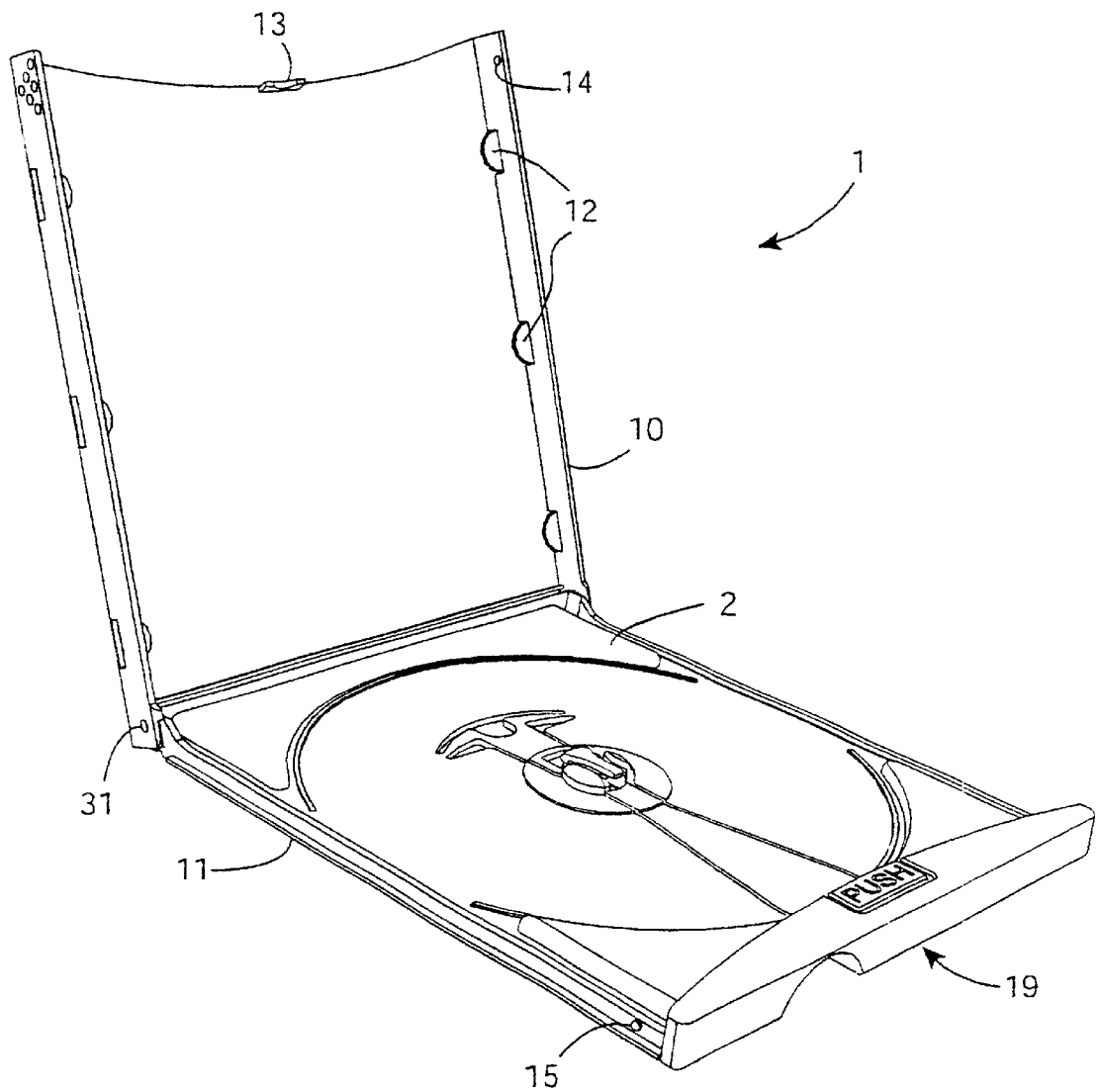
FIG. 3 is a perspective view showing a case with an upper cover opened.

Referring initially to FIG. 1, a CD case 1 has a drawer 2 which slides to the front to reveal a stored compact disc, "CD", and slides back in for storage as indicated by the arrows A. Any desired number of cases 1 may be stacked one on top of the other without need for any external support. This is achieved because the top of each case comprises curved ridges 4 at the front and straight ridges 7 at the back.

The bottom of the case 1 comprises curved grooves 6 corresponding to the curved ridges 4 and straight grooves 7 corresponding to the straight ridges 5. The corresponding grooves and ridges are of sufficient depth and width to grip the cases on the upper and lower sides sufficiently to allow them to stack in a stable manner. The arrangement also allows the cases to slip into registry with each other very easily with little user effort. The inter-engagement of the grooves and ridges is shown most clearly in FIG. 2.

Figure 4:
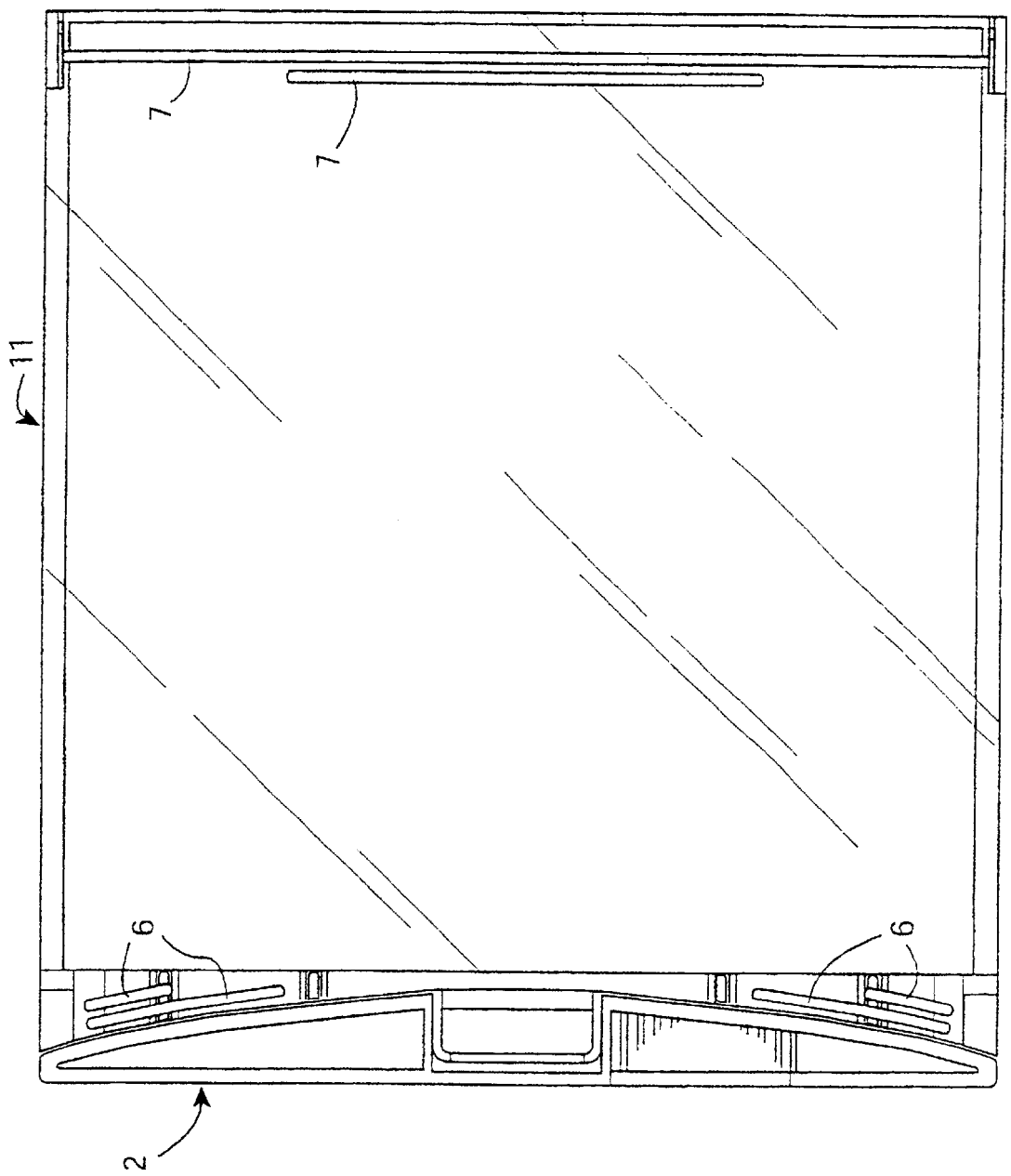
FIG. 4 is an underneath plan view of the case.
Figure 11:
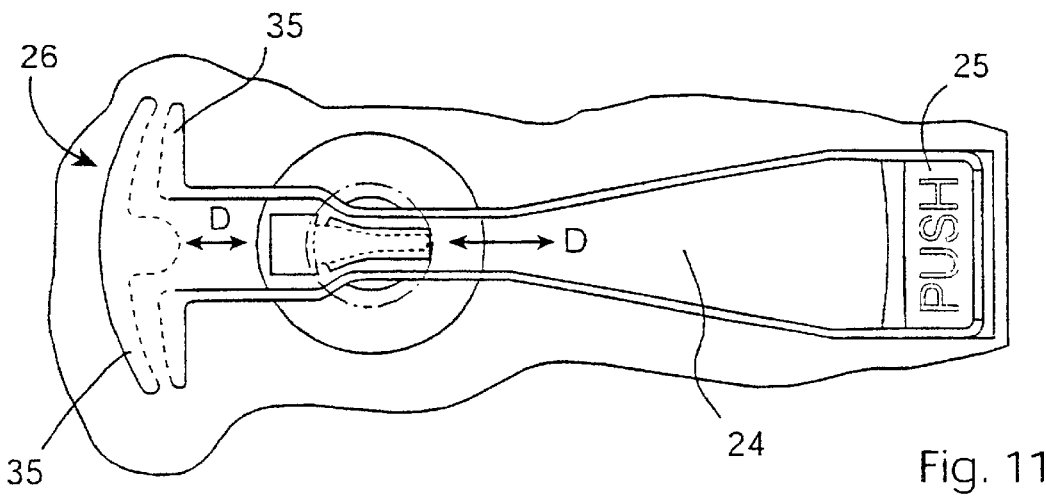
FIG. 11 is a plan view showing operation of a release mechanism.
Figure 10:
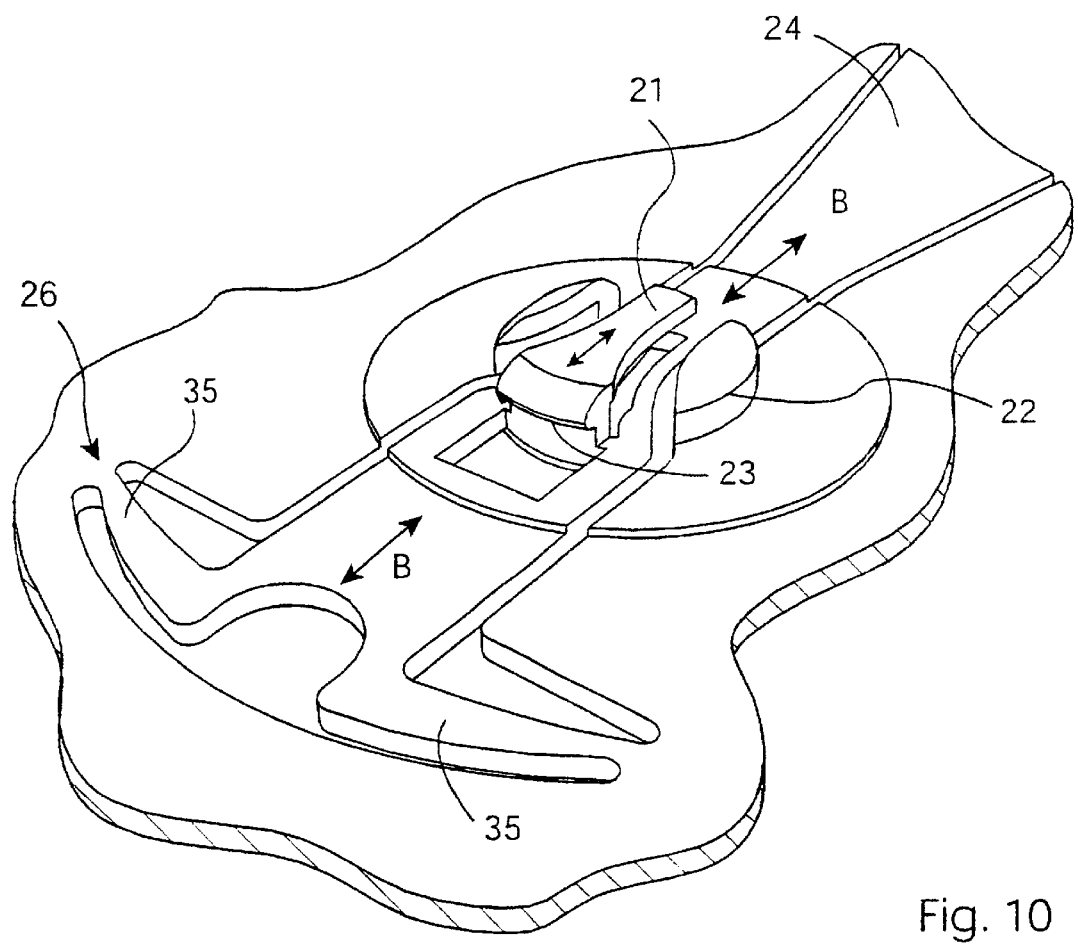
FIG. 10 is ailed perspective view of the central part of the drawer.

Referring to FIGS. 3 to 5, the case comprises an upper cover 10 hinged by a releasable snap-fitting hinge to a lower cover 11. The hinge comprises a pin 30 on each side of the lower cover 11 engaging with corresponding apertures 31 in the upper cover 10. The pins 30 in the lower cover 11 are chamfered so that, if over-stressed, the upper cover 10 slides on the chamfered face and disengages without breaking. This feature is shown in most detail in FIG. 5(b).

The upper cover 10 comprises three tabs 12 on each side and a front projection 13 for retaining an information card in place. For closure, the upper cover 10 comprises apertures 14 for snap-fitting engagement with corresponding projections 15 in the lower cover 11.

The underneath of the case 1 is shown in FIG. 4, in which view the grooves 6 and 7 are visible. This view also illustrates how the drawer 2 projects to the front beyond a curved front edge of the lower cover 11, as it does beyond a curved front edge of the upper cover 10.

The manner in which the lower cover 11 retains an information card C is shown in FIG. 5, which is a perspective view with the drawer 2 removed. The lower cover 11 comprises a pair of rails 16 with front stops 17, and a set of four elongate spacedapart stops 18 along a front edge of the cover 11. The rails 16 and the stops 17 and 18 retain an information card C, however, they also perform the function of guiding the drawer 2 in a smooth sliding action. The projections 18 engage grooves 28 in the underneath of the drawer 2, as shown in FIG. 9. The stops 17 prevent the drawer 2 from being pulled away from the case 2 by engagement with projections extending laterally from the drawer 2.

Referring to FIGS. 6 to 13 inclusive, the drawer 2 comprises a front handle 19 which projects forwardly beyond the upper and lower covers 10 and 11. The drawer 2 also comprises a recessed circular CD seat 20, in the center of which there is a retainer 21 and guides 22. The retainer 21 comprises a lip 23 which snap fits over the side edge of the central aperture of a CD. The retainer is on an arm 24 extending between an actuator, namely a push-button 25 in the handle 19, and a resilient anchorage 26 to the rear side of the retainer 21. The resilient anchorage 26 comprises a pair of resilient arms 35 extending laterally and slightly forwardly between the arm 24 and the main body of the drawer 2.

In operation, a number of the cases 1 may be stacked as illustrated in a simple and convenient manner without need for an external support such as a rack. A CD is placed in position by either opening the upper cover 10 or alternatively by gripping the handle 19 and sliding the drawer out. The latter action is very simple and convenient because of inter-engagement of the drawer 2 with the stops 18 and the rails 16. These provide for a straight sliding action with little user effort.

A CD is placed in the seat 20 by pressing it down so that the retainer 21 snap-fits with the CD to retain it in position. Location of the CD is accurate because the sides of the seat 20 and the guides 22 guide it into a central position. The case 1 is then closed by either closing over the upper cover 10 or pushing the drawer 2 back into position as appropriate.

The simplest way of removing the CD is to grip the handle 19 and to pull die drawer 2 out. Gripping of the handle is facilitated by the finger grip 27 and the fact that the handle 19 projects forwardly. The user then simply presses the button 25 as shown in FIG. 13. This causes a movement of the arm 24 towards the front as indicated by the arrows D in FIG. 13 and 11. This is because the resilient anchorage 26 translates a downward motion at the front of the arm into a mainly forward motion of the arm between the button 25 and the anchorage 26. The movement of the anchorage 26 is illustrated by the interrupted lines of FIG. 11. This movement releases the CD from the grip of the lip 23 and it "pops" up in a releasing action so that the user can lift it off the drawer.

The user may alternatively press down directly on the retainer to release the CD.

It will be appreciated that the invention provides a CD case of very simple construction as it comprises only three parts and all of the parts may be injection moulded. There is no need for additional parts such as springs. Insertion and removal of a CD is very simple because the user only needs to grip the handle 19 and pull the drawer out or push it in as appropriate. The sliding action is very smooth and requires little effort. Removal of a CD involves only pressing the button in the handle 19 and so it requires only one hand. Another advantage of the invention is that a number of the cases stack together without need for a rack. Operation of the drawer is complimentary to the stacldng features as the drawer allows a CD to be removed without removing the cases 1 above it.

The invention is not limited to the embodiments described, but may be varied in construction and detail within the scope of the claims.

What is claimed is:

1. An apparatus for holding a disc-like article, the apparatus comprising:

an upper cover hinged to a lower cover, a drawer comprising means for holding the article and being engaged with one of the upper cover and the lower cover for sliding action between an inner position and a forward position at which the article is exposed, the drawer comprises a handle projecting forwardly of the covers to allow a user to grip the drawer and a retainer for gripping an article, and the retainer being connected to a user actuator in the handle, the actuator including a push button, the retainer being connected to the actuator by an arm, and the arm being connected to the drawer at the end opposite the handle by a resilient anchorage which allows movement of the arm and thereby the retainer in response to user pressing of the actuator.

2. The apparatus as claimed in claim 1, wherein the anchorage comprises means for causing movement of the arm and the retainer in a direction having a longitudinal component in the plane of he drawer.

3. The apparatus as claimed in claim 1, wherein the retainer comprises a lip comprising means for snap-fitting engagement with an article at a side edge.

4. The apparatus as claimed in claim 1, wherein the retainer comprises a push button for user removal of an article.

5. The apparatus as claimed in claim 1, wherein the drawer and one of the upper cover and the lower cover comprise inter-engaging formations for guiding sliding movement of the drawer.

6. The apparatus as claimed in claim 5, wherein the formations comprise projections on one of the upper cover and the lower cover located to retain an information card and which engage corresponding grooves in the drawer.

7. The apparatus as claimed in claim 6, wherein the projections are located adjacent a front side edge of the cover.

8. The apparatus as claimed in claim 1, wherein the covers comprise means for snap-fitting engagement when closed.

9. The apparatus as claimed in claim 1, wherein the covers comprise formations on upper and lower surfaces of the case for engagement when stacked one on top of the other.

10. The apparatus as claimed in claim 9, wherein the formations comprise ridges on an upper surface of the case, and corresponding grooves in a lower surface of the case.

11. The apparatus as claimed in claim 9, wherein at least some of the formations are curved.

12. The apparatus as claimed in claim 1, wherein the covers are hinged together by a releasable hinge.

13. The apparatus as claimed in claim 12, wherein the releasable hinge comprises a chamfered pin and corresponding aperture on each side of the covers, the chamfered face of the pin being located whereby over-stressing of the hinge causes a sliding movement over said face to disengage the pin from the aperture.

14. The apparatus as claimed in claim 1, wherein the covers and the drawer are of injection moulded construction.

15. An apparatus for holding a disc-like article, the apparatus comprising:

an upper cover hinged to a lower cover, a drawer comprising means for holding the article and being engaged with one of the upper cover and the lower cover for sliding action between an inner position and a forward position at which the article is exposed, the drawer comprises a handle projecting forwardly of the covers to allow a user to grip the drawer;

the drawer comprises a retainer for gripping an article, and the retainer being connected to a user actuator in the handle;

the retainer being connected to the actuator by an arm; and the arm being connected to the drawer at the end opposite the handle by a resilient anchorage which allows movement of the arm and thereby the retainer in response to user pressing of the actuator.

\* \* \* \* \*